(12) United States Patent
Hashimoto et al.

(10) Patent No.: US 7,550,707 B2
(45) Date of Patent: Jun. 23, 2009

(54) BIOMETRICS AUTHENTICATION SYSTEM WITH AUTHENTICATION BASED UPON MULTIPLE LAYERS

(75) Inventors: Gakuji Hashimoto, Kanagawa (JP); Kiyoshi Osato, Chiba (JP); Isao Ichimura, Tokyo (JP); Toshio Watanabe, Kanagawa (JP); Takashi Nakao, Tokyo (JP); Kenji Yamamoto, Kanagawa (JP); Hideo Sato, Tokyo (JP); Junji Kajihara, Tokyo (JP); Kengo Hayasaka, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/071,638

(22) Filed: Feb. 25, 2008

(65) Prior Publication Data

US 2008/0211628 A1 Sep. 4, 2008

(30) Foreign Application Priority Data

Mar. 1, 2007 (JP) ............................. 2007-051032

(51) Int. Cl.
*G08B 13/18* (2006.01)
*G06F 7/04* (2006.01)
(52) U.S. Cl. .................. 250/221; 340/5.82; 340/5.83
(58) Field of Classification Search ............... 250/221, 250/556; 382/115; 340/5.82, 5.83
See application file for complete search history.

(56) References Cited

U.S. PATENT DOCUMENTS 6,795,157 B2 * 9/2004 Okuwaki et al. ............ 349/200
6,813,010 B2 * 11/2004 Kono et al. ................... 356/71
7,147,153 B2 * 12/2006 Rowe et al. .................. 235/382
7,366,331 B2 * 4/2008 Higuchi ...................... 382/124
2005/0236553 A1 * 10/2005 Noto et al. ................ 250/208.1
2006/0210154 A1 * 9/2006 Leveque et al. ............ 382/165
2007/0242859 A1 * 10/2007 Connell et al. ............. 382/115

FOREIGN PATENT DOCUMENTS

| JP | 2003-084259 | 3/2003 |
| JP | 2003-283932 | 10/2003 |
| JP | 2005-069936 | 3/2005 |
| JP | 2006-068328 | 3/2006 |
| JP | 2006-288872 | 10/2006 |
| WO | WO-2006/039486 A2 | 4/2006 |

OTHER PUBLICATIONS

Ng et al., "Light Field Photography With a Hand-Held Plenoptic Camera", Standford Tech Report CTSR 2005-02, pp. 1-11.

* cited by examiner

*Primary Examiner*—Stephen Yam
(74) *Attorney, Agent, or Firm*—Rader Fishman & Grauer PLLC; Ronald P. Kananen

(57) ABSTRACT

A biometrics authentication system capable of achieving high precision and high safety is provided. A biometrics authentication system includes: a light source applying light to a living organism; a microlens array section condensing light from the living organism, and including a plurality of microlenses each having a different refractive power; an image pickup device obtaining image pickup data on a plurality of layers of the living organism on the basis of light condensed by the microlens array section; and an authentication section performing authentication of the living organism on the basis of image pickup data on the plurality of layers of the living organism.

9 Claims, 14 Drawing Sheets

BIOMETRICS AUTHENTICATION SYSTEM WITH AUTHENTICATION BASED UPON MULTIPLE LAYERS

CROSS REFERENCES TO RELATED APPLICATIONS

The present invention contains subject matter related to Japanese Patent Application JP 2007-051032 filed in the Japanese Patent Office on Mar. 1, 2007, the entire contents of which being incorporated herein by reference.

BACKGROUND OF THE INVENTION

1. Field of the Invention

The present invention relates to a biometrics authentication system using a microlens array.

2. Description of the Related Art

In recent years, the introduction of personal identification techniques (biometrics) using biometrics authentication into access control in a specific area or bank ATMs has begun. Therefore, an increase in crimes by fake ID cards or identity thefts has become a social issue, so the establishment of a method of personal identification capable of preventing forgery is desired.

As such, a method of identifying a living organism, and methods using faces, fingerprints, voiceprints, irises, veins and the like as authentication data have been proposed. For example, in a system using faces as authentication data, it is difficult to precisely capture characteristics of individuals due to physical conditions or makeup, and the characteristics of faces are easily changed due to growth, so it is difficult to use the same data throughout a lifetime. Therefore, in authentication using faces, it is considered difficult to achieve high precision in general. Moreover, fingerprints, voiceprints, irises and the like are personal information which is relatively less changed; however, forgery such as duplication of a fingerprint through the use of a resin, recording and reproducing of a voiceprint through the use of a recorder, duplication of an iris pattern through the use of a high-definition printer has been perceived as an issue.

On the other hand, the shape pattern of veins under the skin of a finger or a palm hardly changes from approximately two or three years of age, so the shape pattern of the veins can be used as stable authentication data throughout a lifetime. Moreover, it is difficult to visually check veins directly from the skin surface, so it is difficult to forge, and various proposals have been made (for example, refer to Japanese Unexamined Patent Application Publication No. 2006-68328).

Now, in FIG. 14A, an example of a biometrics authentication system in a related art using the above-described vein authentication system is shown. In a technique in the related art, when a finger 2 as an object subjected to authentication is held over a specified position, the vein pattern authentication can be performed. More specifically, when the finger 2 is irradiated with near-infrared radiation by a light source 100 such as an LED (Light Emitting Diode) arranged on the lateral side (or the longitudinal side) of the finger 2, optical absorption of blood hemoglobin flowing through veins can be observed. One refractive converging lens 101 forms an image of veins by such optical absorption on an image pickup device 102 such as a CCD (Charge Coupled Device) or a CMOS (Complementary Metal Oxide Semiconductor), and authentication data including a vein shape shown in FIG. 14B can be obtained.

Moreover, to improve the precision (resolution) of authentication data, techniques using a compound eye optical system such as a microlens array using a plurality of microlenses have been proposed (for example, refer to Japanese Unexamined Patent Application Publication Nos. 2003-283932 and 2005-69936). In general, to improve the resolution in a configuration shown in FIG. 14A, it is necessary to increase the numbers of pixels (the sizes of pixels in the case where the pixel pitch is the same) of the converging lens 101 and the image pickup device 102. Therefore, as the converging lens 101, it is necessary to use a lens with a high numeral aperture (NA). However, the lens with a high numeral aperture easily causes aberration, and its manufacturing cost is high, so it is not practical. On the other hand, in the compound eye optical system using a microlens array, a high-precision image can be obtained at low cost by performing image processing on the basis of a plurality of data obtained by the microlenses. Therefore, when a microlens array is used instead of the converging lens 101, the precision of the image data can be improved.

SUMMARY OF THE INVENTION

However, in a biometrics authentication system with the above-described configuration, one plane inside a finger is an object subjected to authentication, so as authentication data, two-dimensional data is obtained. Therefore, for example, in the case where a finger is placed on glass or the like to perform authentication, authentication data of a surface in contact with the glass of the finger is obtained, but data of a part not in contact with the glass of the finger is not obtained, so there is a difference in obtained data due to the placement of the finger, so authentication precision is not sufficient. Moreover, when authentication data is exploited by some way, in the case of the two-dimensional authentication data, the authentication data can be duplicated, so an issue arises in terms of safety.

In view of the foregoing, it is desirable to provide a biometrics authentication system capable of achieving high precision and high safety.

According to an embodiment of the invention, there is provided a biometrics authentication system including a light source applying light to a living organism; a microlens array section condensing light from the living organism; and including a plurality of microlenses each having a different refractive power; an image pickup device obtaining image pickup data on a plurality of layers of the living organism on the basis of the light condensed by the microlens array section; and an authentication section performing authentication of the living organism on the basis of the image pickup data on the plurality of layers of the living organism.

In the biometrics authentication system according to the embodiment of the invention, when light is applied from the light source to the living organism, as the plurality of microlenses each microlens has a different refractive power, an image of the living organism is picked up according to each refractive power, and image pickup data on a plurality of layers of the living organism can be obtained. Then, for example, a combination of the image pickup data on the plurality of layers with information about the focal positions of the microlenses is processed, whereby three-dimensional shape information including depth information of the living organism can be produced, and the authentication of the living organism is performed on the basis of the three-dimensional information.

Included in the biometrics authentication system according to the embodiment of the invention are the light source applying light to a living organism; the microlens array section condensing light from the living organism, and including the plurality of microlenses each having a different refractive power; the image pickup device obtaining image pickup data on a plurality of layers of the living organism on the basis of the light condensed by the microlens array section; and the authentication section performing authentication of the living organism on the basis of the image pickup data on the plurality of layers of the living organism are included. So, on the basis of the image pickup data on the plurality of layers of the living organism, three-dimensional shape information including depth information of the living organism can be produced and biometrics authentication on the basis of the three-dimensional information can be performed. Therefore, compared to the case where biometrics authentication is performed on the basis of two-dimensional information like a related art, authentication precision can be improved, and it is difficult to duplicate authentication information, so safety can be improved.

Other and further objects, features and advantages of the invention will appear more fully from the following description.

DETAILED DESCRIPTION OF THE PREFERRED EMBODIMENTS

Preferred embodiments will be described in detail below referring to the accompanying drawings.

First Embodiment

Figure 1:
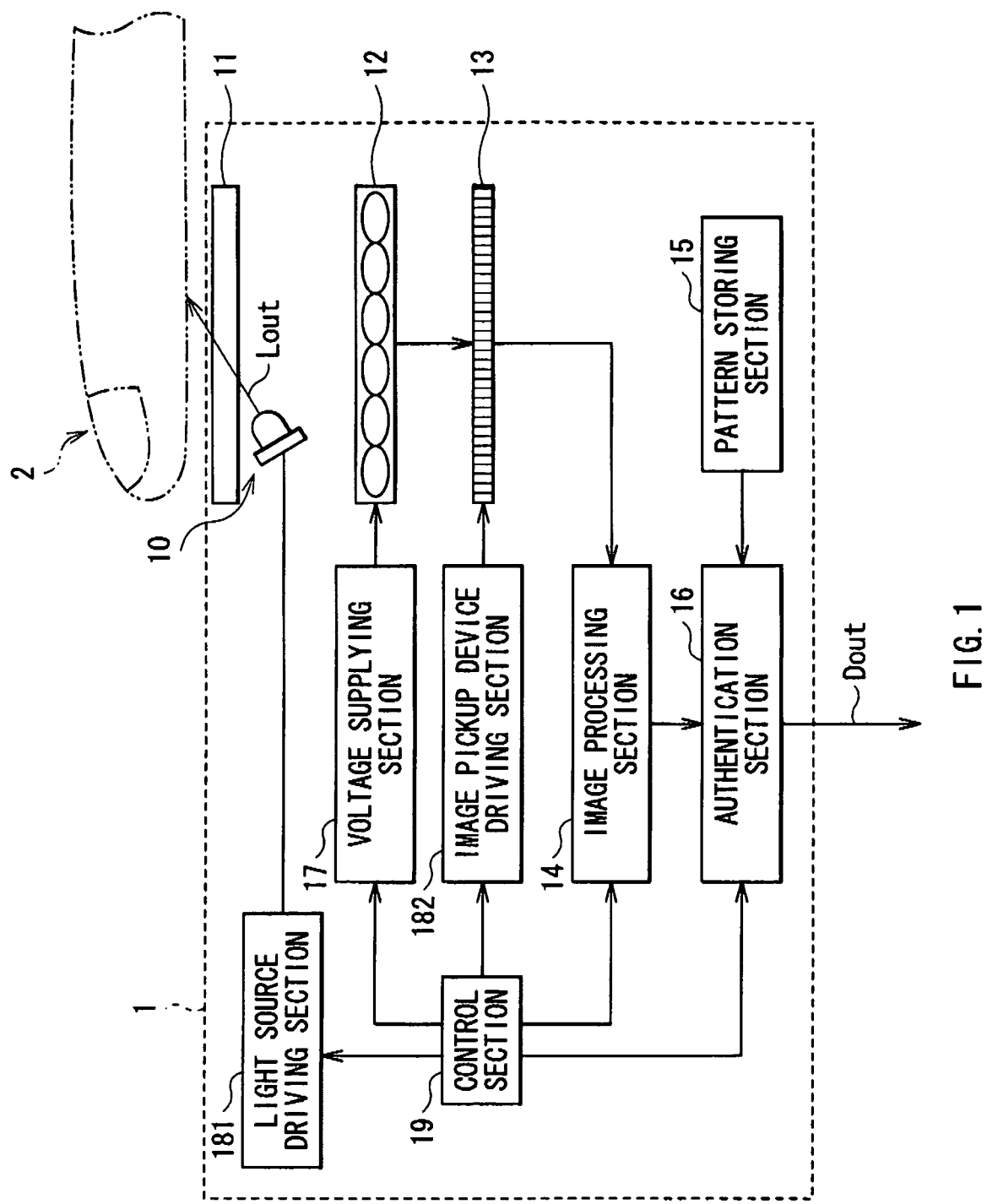
FIG. 1 is a block diagram showing the whole configuration of a biometrics authentication system according to a first embodiment of the invention.
Figure 2:
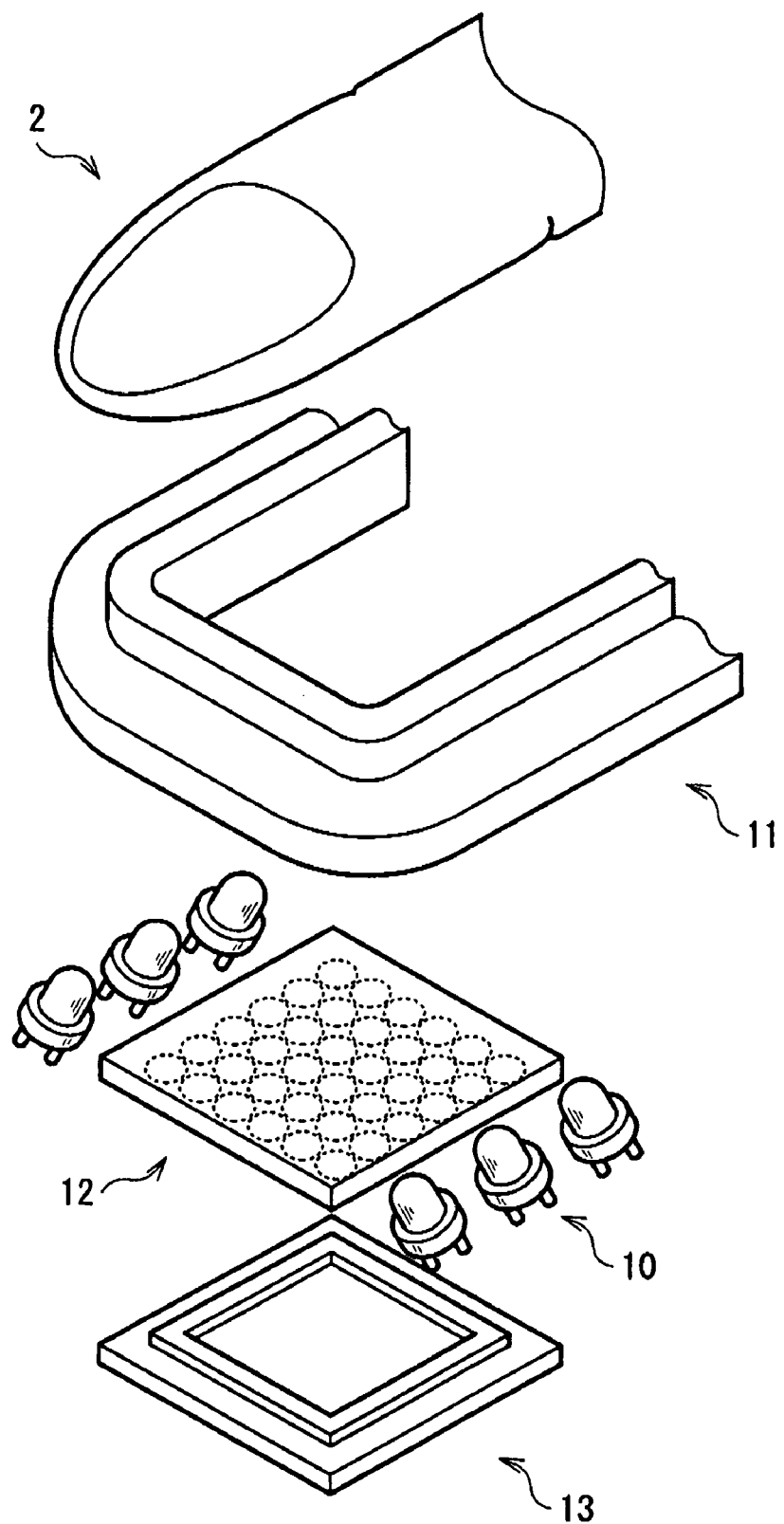
FIG. 2 is a perspective view of an outline configuration of the biometrics authentication system according to the first embodiment of the invention.

FIG. 1 shows the whole configuration of a biometrics authentication system (a biometrics authentication system 1) according to a first embodiment of the invention. FIG. 2 shows a perspective view showing an outline configuration of the biometrics authentication system 1. The biometrics authentication system 1 picks up an image of a living organism (for example, a fingertip) 2 as an object subjected to image pickup to perform biometrics authentication, and outputs authentication result data Dout, and the biometrics authentication system 1 includes a light source 10, a fixing cup 11, a microlens array 12, an image pickup device 13, an image processing section 14, a pattern storing section 15, an authentication section 16, a voltage supplying section 17, a light source driving section 181, an image pickup device driving section 182 and a control section 19. The microlens array 12 changes its refractive power.

The light source 10 applies light to the living organism 2 as an object subjected to image pickup, and is formed of, for example, an LED (Light Emitting Diode) or the like. The light source 10 emits light of a near-infrared wavelength region (a wavelength region approximately from 700 nm to 1200 nm). It is because in the case where light of such a wavelength region is used, by the balance between the transmittance through a living organism and the absorption into reduced hemoglobin (a vein) in the living organism, light use efficiency in the case of performing the vein authentication of the living organism 2 can be further improved.

The fixing cup 11 fixes and holds the living organism 2 during authentication, and the bottom surface of the fixing cup 11 may have an opening, or may have a configuration allowing light to pass therethrough, that is, a configuration in which a transparent member such as a cover glass is arranged.

The microlens array 12 includes a plurality of microlenses which will be described later and are arranged in a matrix form, and is arranged below the fixing cup 11 (more specifically between the fixing cup 11 and the image pickup device 13). The microlenses in the microlens array 12 are formed of liquid lenses, liquid crystal lenses or the like, and are variable focusing lenses varying a focal position when an arbitrary voltage is applied. The microlenses function as image pickup lenses for picking up an image of the living organism 2 as an object subjected to image pickup. The microlens array 12 will be described in detail later.

The image pickup device 13 receives light from the microlens array 12 to obtain image pickup data, and is arranged on a focal plane of the microlens array 12 during vein authentication which will be described later. The image pickup device 13 includes a plurality of CCDs or the like arranged in a matrix form.

The image processing section 14 performs predetermined image processing on the image pickup data obtained in the image pickup device 13 in response to the control of the control section 19 to output the image pickup data to the authentication section 16. In addition, the image processing section 14, and the authentication section 16 and the control section 19, which will be described later, each include, for example, a microcomputer or the like.

The pattern storing section 15 is a section storing a biometrics authentication pattern (which is a comparison pattern relative to an image pickup pattern obtained at the time of authentication, and which is obtained by picking up an image of a living organism in advance), and includes a nonvolatile memory device (for example, an EEPROM (Electrically Erasable Programmable Read Only Memory) or the like). The authentication section 16 is a section performing authentication of the living organism 2 as an object subjected to image pickup by comparing an image pickup pattern outputted from the image processing section 14 to the biometrics authentication pattern stored in the pattern storing section 15 in response to the control of the control section 19.

The voltage supplying section 17 supplies a voltage to the microlenses in the microlens array 12, and as will be described in detail later, the refractive power of the microlens array 12 is changed on the basis of the magnitude of the supplied voltage.

The light source driving section 181 drives the light source 10 to emit light in response to the control of the control section 19. The image pickup device driving section 182 drives the image pickup device 13 to pick up an image (to receive light) in response to the control of the control section 19. The control section 19 controls the operations of the image processing section 14, the authentication section 16, the voltage supplying section 17, the light source driving section 181 and the image pickup device driving section 182.

Figure 3:
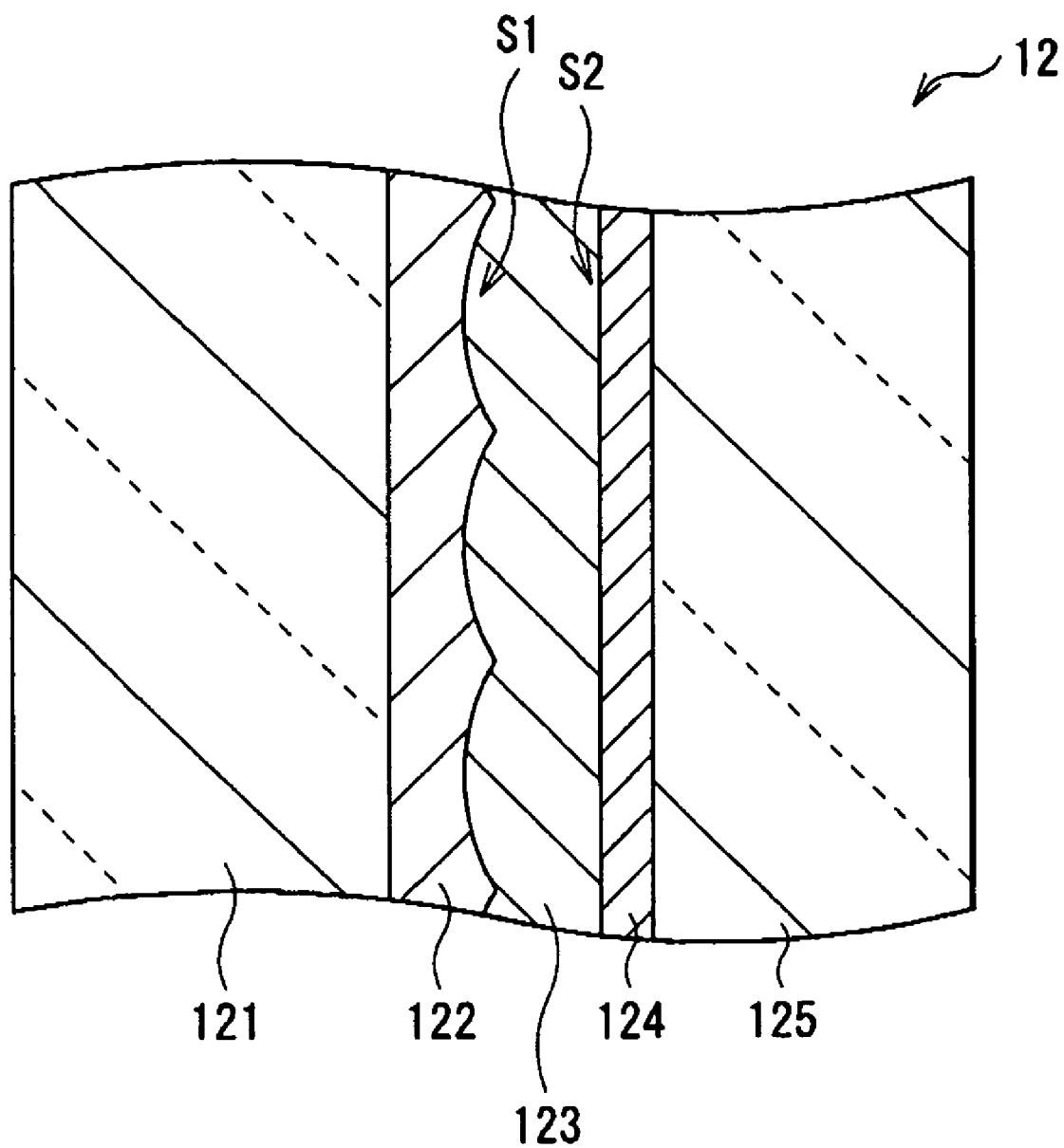
FIG. 3 is an enlarged sectional view showing a configuration example of a microlens array according to the first embodiment of the invention.

Next, referring to FIG. 3, the configuration of the microlens array 12 will be described in detail below. FIG. 3 shows an enlarged sectional view of the microlens array 12.

In the microlens array 12, a liquid crystal layer 123 is formed between a pair of facing substrates 121 and 125, and electrodes 122 and 124 are formed between the liquid crystal layer 123 and the substrate 121 and between the liquid crystal layer 123 and the substrate 125, respectively.

The substrates 121 and 125 each are formed of, for example, a transparent substrate, such as a glass substrate, and an incident light ray can pass through the substrates 121 and 125. A voltage is supplied to the electrodes 122 and 124 from the voltage supplying section 17. The electrodes 122 and 124 each are formed of a transparent electrode, for example, ITO (Indium Tin Oxide), and as in the case of the substrates 121 and 125, the incident light ray can pass through the electrodes 122 and 124. On a surface S1 of the electrode 122 of surfaces S1 and S2 of the electrodes 122 and 124, a plurality of concave curved surfaces are formed in a matrix form, thereby a plurality of liquid crystal microlenses are formed. The liquid crystal layer 123 is formed of, for example, a liquid crystal material such as nematic liquid crystal, and the refraction index of the liquid crystal layer 123 is changed according to a voltage applied between the electrodes 122 and 124.

Figure 4:
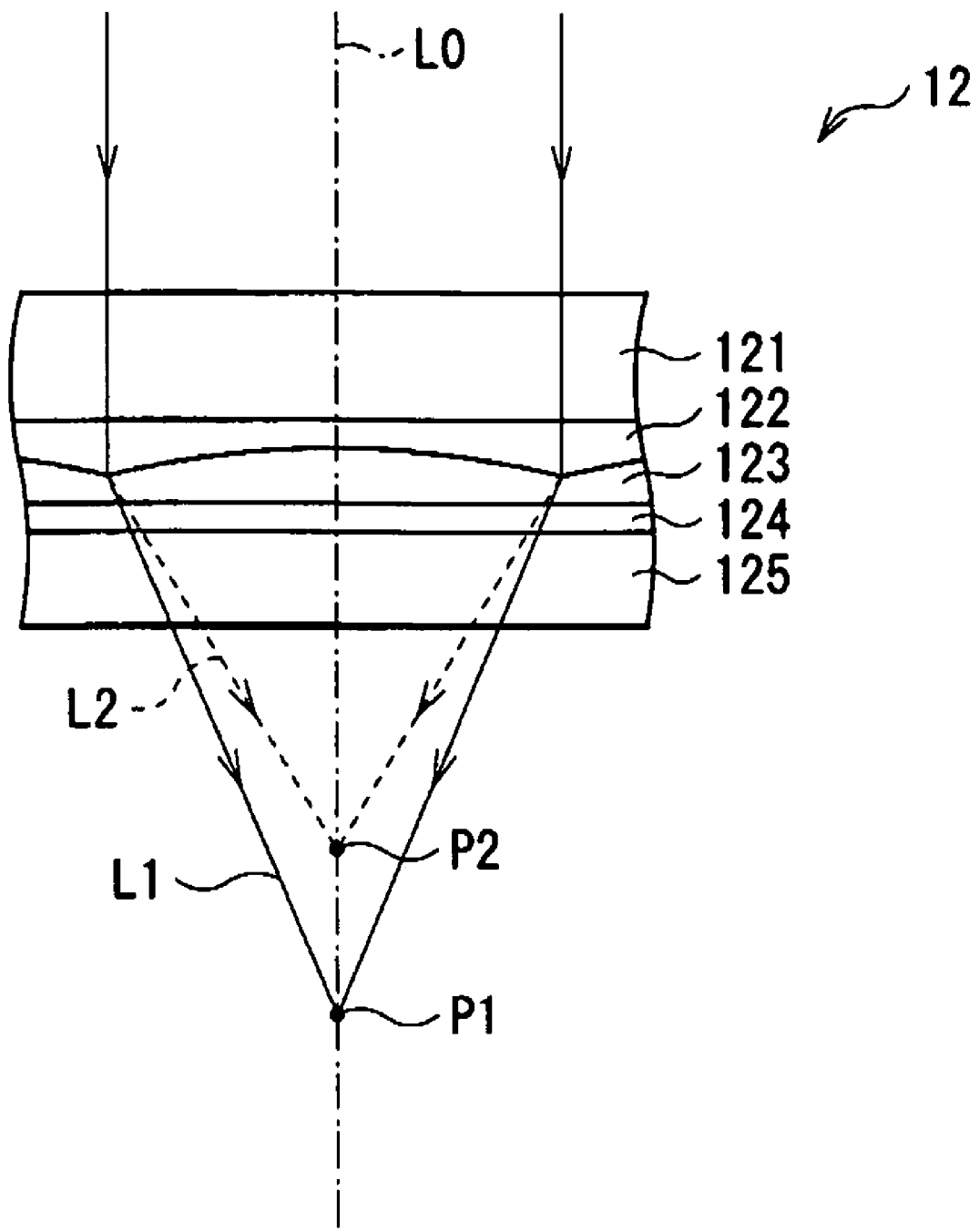
FIG. 4 is a sectional view for describing a function of the microlens array according to the first embodiment of the invention.
Figure 5:
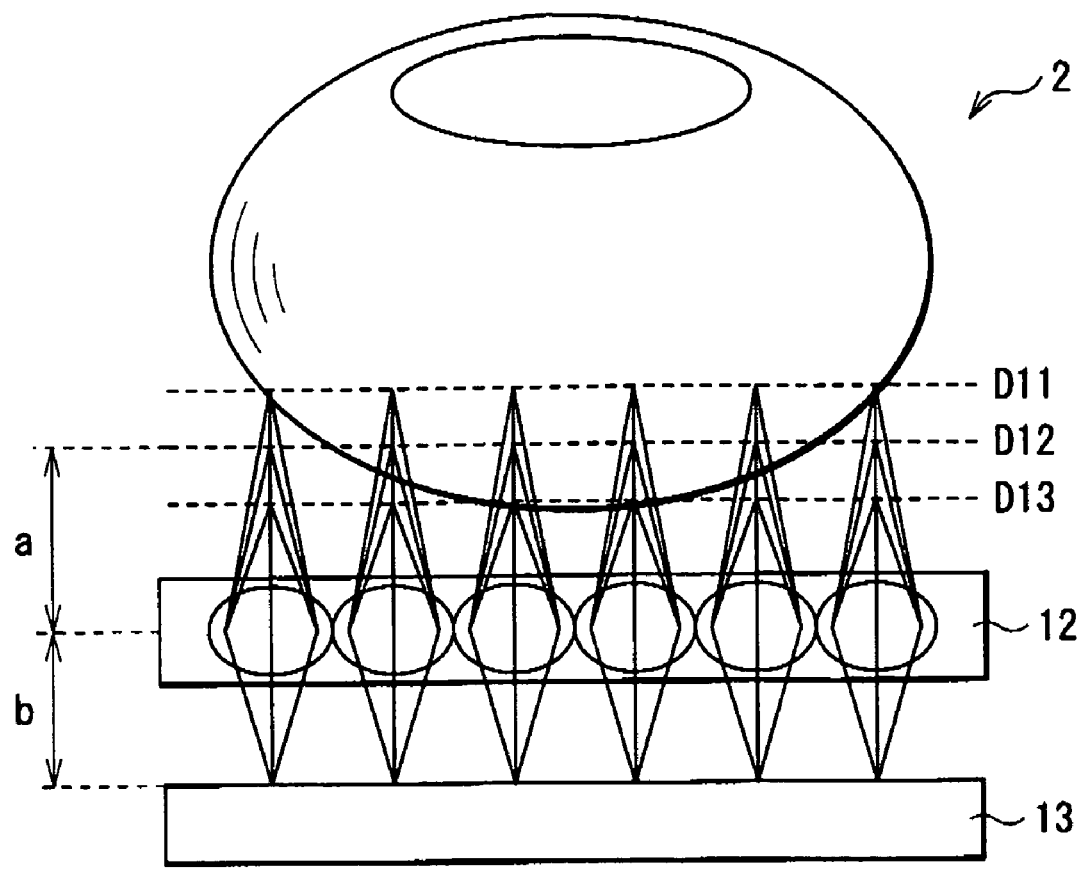
FIG. 5 is a sectional view of essential parts of optical paths when obtaining a vein pattern of a living organism according to the first embodiment of the invention.

Next, referring to FIGS. 1 to 5, the operation (a biometrics authentication process) of the biometrics authentication system 1 according to the embodiment will be described in detail below. FIG. 4 shows a sectional view for describing a function of the microlens array 12, and FIG. 5 shows a sectional view of essential parts of optical paths when obtaining a vein pattern of a finger.

In the biometrics authentication system 1, at first, when the living organism (for example, a fingertip) 2 is placed on the fixing cup 11, light Lout is emitted from the light source 10 by the driving operation of the light source driving section 181, and the light Lout is applied to the living organism 2 from the bottom surface of the fixing cup 12. Then, a voltage is supplied to the microlenses in the microlens array 12 (more specifically between the electrodes 122 and 124) from the voltage supplying section 17 in response to the control of the control section 19, and when an image of the living organism 2 is picked up in this state, the vein pattern of the living organism 2 is obtained. At this time, when the voltage supplied to the microlenses is low, the refractive index of the liquid crystal layer 123 is reduced accordingly, and as a result, for example, like a light ray L1 in FIG. 4, the incident light ray toward the microlenses is refracted in a refraction direction forming a relatively small refraction angle to be condensed at a relatively long focal length (for example, at a focal point position P1 on an optical axis L0 shown in FIG. 4). On the other hand, when the voltage supplied to the microlenses is high, the refractive index of the liquid crystal layer 123 is increased accordingly, and as a result, for example, like a light ray L2 in FIG. 4, the incident light ray toward the microlenses is refracted in a refraction direction forming a relatively large refraction angle to be condensed at a relatively short focal length (for example, at a focal point position P2 on an optical axis L0 shown in FIG. 4).

Thus, a change in the supplied voltage causes a different refractive power, whereby the focal length of the microlens array 12 can be changed. Therefore, when a voltage is supplied a plurality of times so that the voltage is changed in stages, image pickup data of veins (vein patterns) on a plurality of different layers inside the living organism 2 can be obtained in the image pickup device 13. For example, as shown in FIG. 5, a supplied voltage to the microlenses is changed to V1, V2 and V3 (V1<V2<V3) (not shown) to obtain image pickup data in each state, thereby vein patterns on three layers D11, D12 and D13 inside the living organism 2 can be obtained.

A specific example in the case of actually obtaining three-dimensional information by the above-described technique will be described below. At first, assuming that a distance from the lens center of the microlens array 12 to an object is "a", a distance from the lens center to an image pickup plane is "b," and the focal length of a lens is "f," a relationship shown in Formula (1) is established. Moreover, under the assumption that the thickness of the living organism 2 as an object to be measured is approximately 10 mm, in the case where when the living organism 2 is placed on the fixing cup 11, three-dimensional information having a=4, b=4, and 4 mm (a=4±2 mm) in an optical axis depth direction (in the depth direction of the living organism 2) is attempted to be obtained, by Formula (1), the value of f is 1.3 to 2.4. Assuming that a lens diameter D is 0.2, by Formula (2), the value of NA becomes 0.04 to 0.08. The value is considered to be sufficiently feasible even in the case where the liquid lens or the liquid crystal lens is used. Moreover, in the case where it is difficult to achieve the value with a single lens, a combination with a refractive lens in a related art can be used, and, for example, a lens with NA of 0.06 is formed by using a refractive lens, and the NA change amount of ±0.02 may be achieved by a microlens.

$$1/a + 1/b = 1/f \qquad \text{Formula (1)}$$

$$NA = D/2f \qquad \text{Formula (2)}$$

Moreover, assuming that the diameter of a permissible circle of confusion on a film in a lens for photograph is $\phi$, a focal depth H (on one side) of an optical system is estimated by Formula (3). In general, with an optical system of a 35-mm film, the diameter $\phi$ is considered to be approximately 40 μm, so the value of the focal depth H is 0.27 mm (f=1.3) to 0.48 mm (f=2.4). Therefore, in the case of attempting to obtain a three-dimensional image with 4 mm in a depth direction, when 5 to 8 images are obtained by changing the focal length f of the microlens, while satisfying the condition of the diameter φ of the permissible circle of confusion, sequential image information in the depth direction inside the living organism 2 can be obtained.

$$H = \phi \cdot f/D \quad \text{Formula (3)}$$

In the embodiment, a plurality of image pickup data are obtained by sequentially changing the focal length, so there is an issue that time necessary for authentication is longer than that in the case where authentication is performed with two-dimensional information. However, in general, the liquid lens or the liquid crystal lens can achieve a very fast response frequency (a step response of several tens of milliseconds), compared to a mechanical drive system variable focusing lens such as a zoom lens. Therefore, time necessary to shoot the above-described number of images is estimated to be approximately within 1 second. Therefore, it is considered that sufficient authentication can be performed while the living organism 2 is held by the fixing cup 11, so the issue is practically insignificant.

Figure 6:
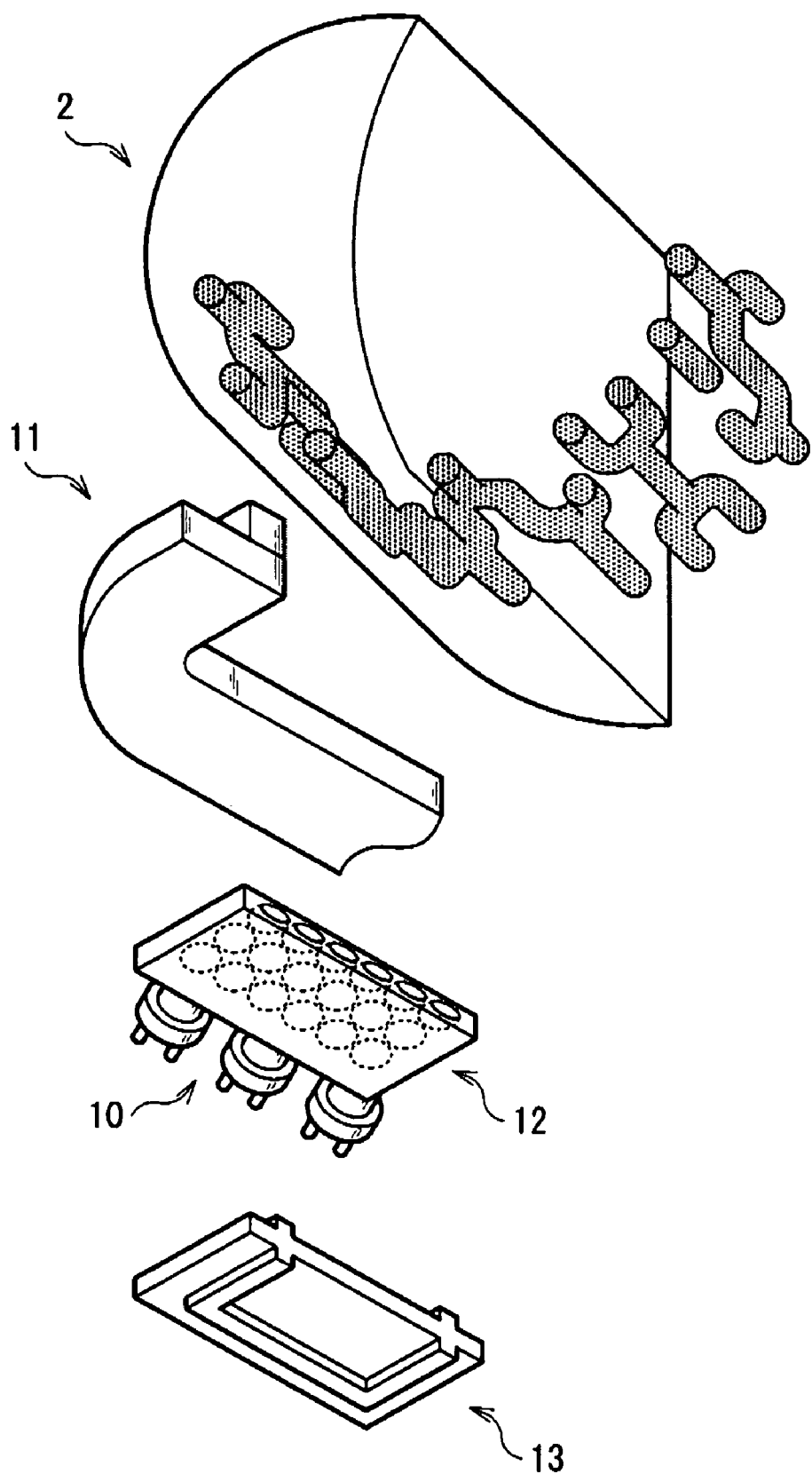
FIG. 6 is a schematic view of three-dimensional shape information obtained by the invention.

The vein patterns on a plurality of layers which are obtained in the above-described manner are inputted into the image processing section 14, and in the image processing section 14, for example, three-dimensional shape information shown in FIG. 6 is produced. More specifically, after each of a plurality of obtained image pickup data is reconstructed into a high-resolution two-dimensional image by, for example, a system described in Japanese Unexamined Patent Application Publication No. 2003-283932 or the like, a plurality of two-dimensional images and the focal position information of the lenses are combined and converted into three-dimensional information. Moreover, a three-dimensional shape shown in FIG. 6 can be formed by performing an edge process and a binarization process. Then, the three-dimensional information produced in such a manner is inputted into the authentication section 16.

Next, in the authentication section 16, the inputted vein pattern is compared to the authentication pattern for vein authentication stored in the pattern storing section 15, thereby vein authentication is performed. In the authentication section 16, the result of the vein authentication is considered, and a final biometrics authentication result (the authentication result data Dout) is outputted, thereby the biometrics authentication is completed.

As described above, in the biometrics authentication system 1 according to the embodiment, an image of the living organism 2 is picked up while changing a voltage supplied to the microlenses, so the refractive powers of the microlenses are changed, thereby a plurality of vein image pickup data in the depth direction of the living organism 2 can be obtained. When the image pickup data and the focal position information are combined, the three-dimensional shape information of the veins of the living organism 2 is produced. Feature points of the veins of the living organism 2 extracted from such three-dimensional information have a large amount of information, compared to the case of two-dimensional information, so individual identification can be performed with higher precision than in a related art. Moreover, as the amount of information is large, it is difficult to duplicate the data, so high safety can be secured.

Second Embodiment

Figure 7:
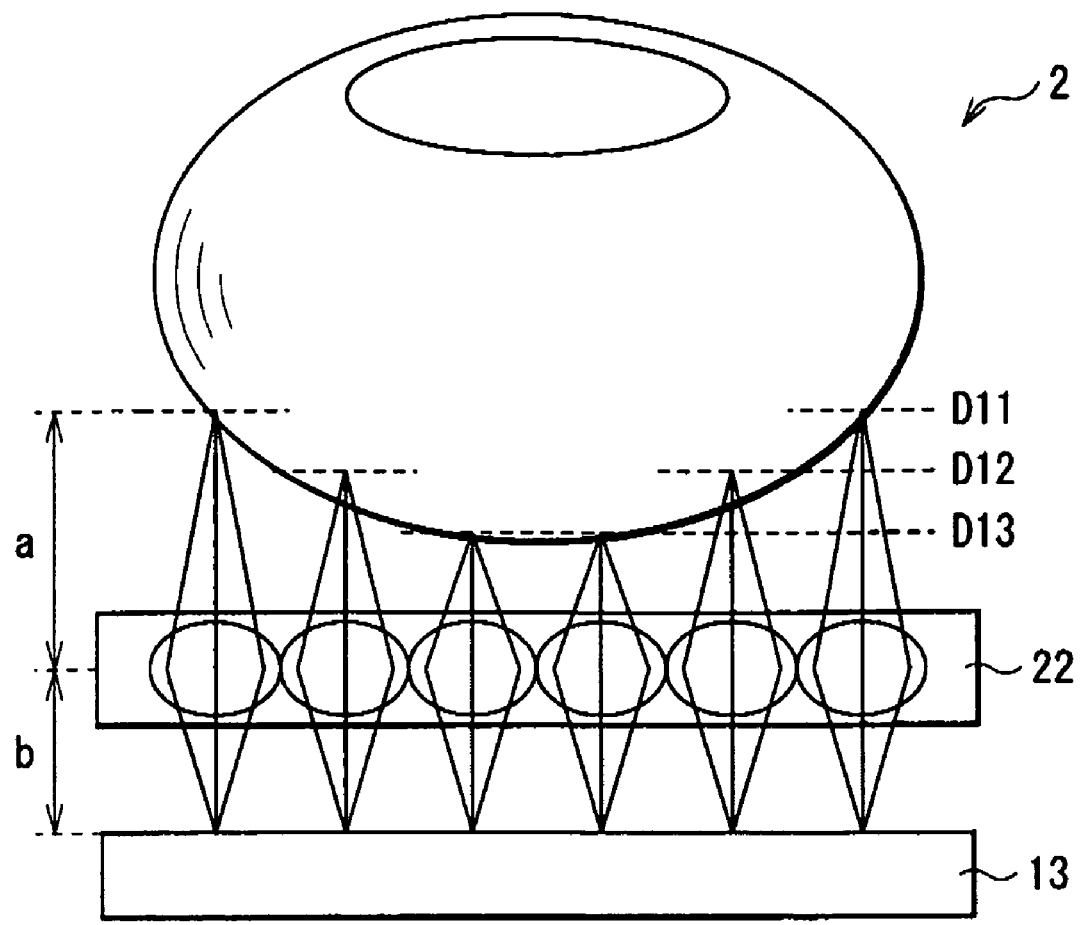
FIG. 7 is a sectional view of essential parts of optical paths when obtaining a vein pattern of a living organism according to a second embodiment of the invention.

FIG. 7 shows a sectional view of essential parts of optical paths when obtaining a vein pattern of the living organism 2 in a biometrics authentication system according to a second embodiment of the invention. The biometrics authentication system according to the embodiment has the same configuration as that of the biometrics authentication system according to the first embodiment, except that a microlens array 22 has a different configuration from the microlens array 12 in the first embodiment. More specifically, in the first embodiment, a plurality of microlenses arranged in the microlens array 12 change their refractive powers in response to a supplied voltage; however, in the embodiment, each microlens constituting the microlens array 22 has each different refractive power. Therefore, the configuration of the microlens array 22 will be described in detail below, and the same configuration as that in the first embodiment will not be further described.

The microlens array 22 includes a plurality of microlenses each having a different power (focal length). As the microlenses, fixed focus lenses may be used, or liquid lenses, liquid crystal lenses or the like may be used. In the microlens array 22, as shown in FIG. 7, a plurality of microlenses are arranged along the shape of the living organism 2 so as to focus on layers D11, D12 and D13 in the living organism 2.

Figure 8:
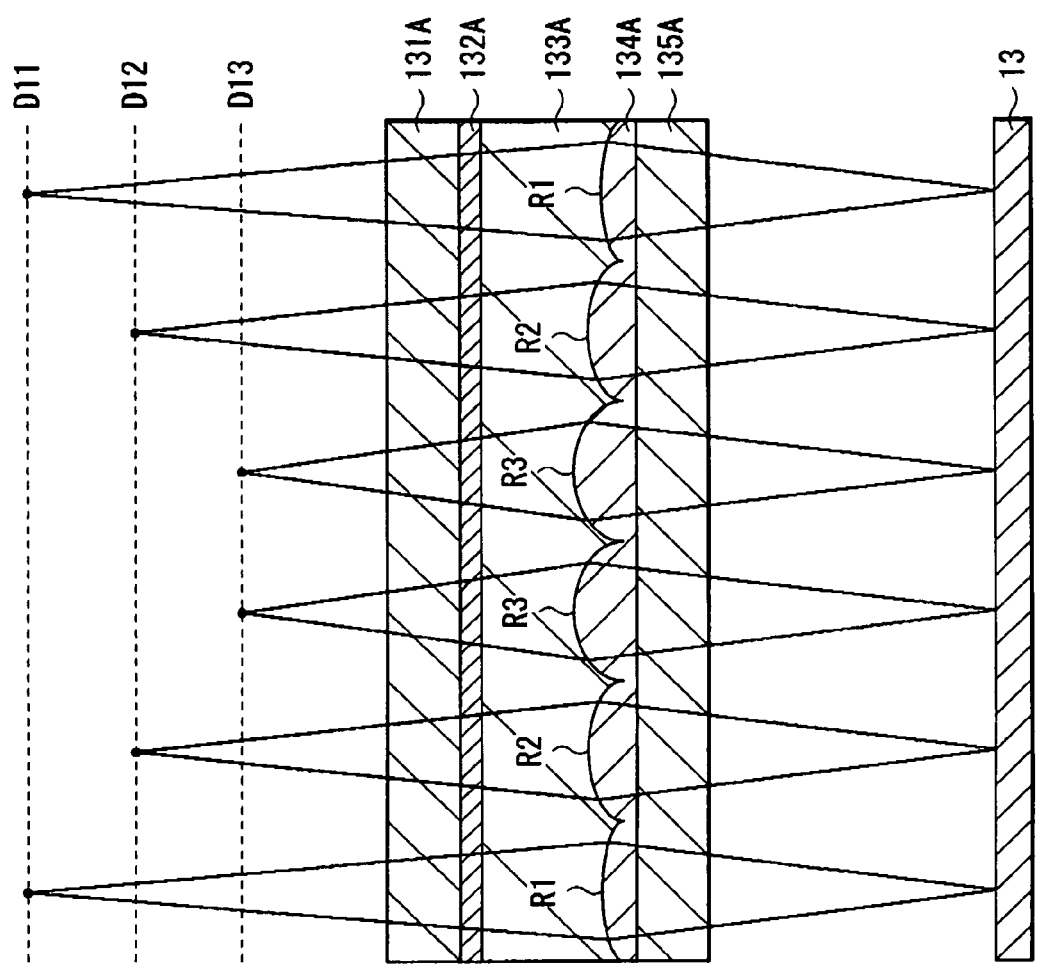
FIG. 8 is an enlarged sectional view showing a configuration example of a microlens array according to the second embodiment of the invention.
Figure 9:
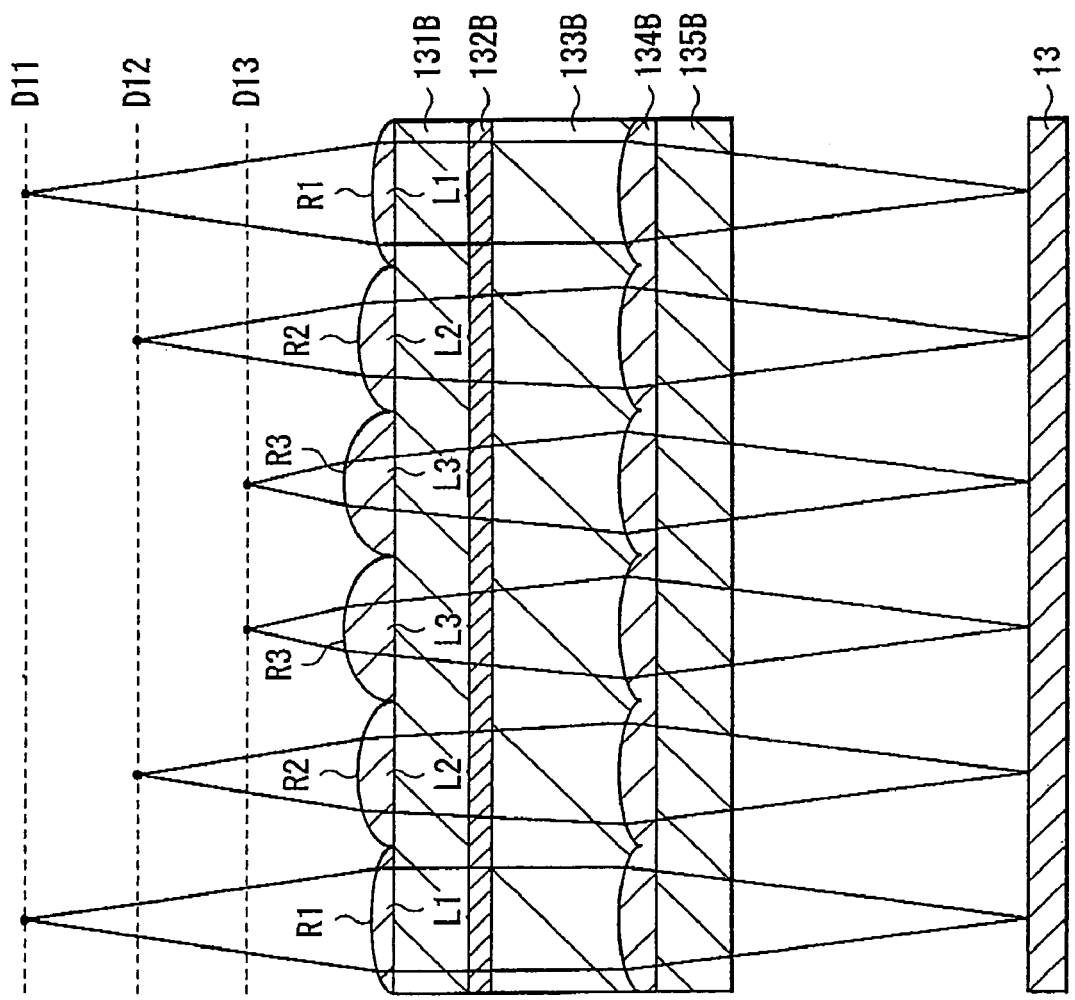
FIG. 9 is an enlarged sectional view showing a configuration example of the microlens array according to the second embodiment of the invention.

More specifically, as shown in FIGS. 8 and 9, a plurality of microlenses may be arranged. In FIG. 8, a liquid crystal layer 133A is arranged between facing substrates 131A and 135A, and electrodes 132A and 134A are formed between the liquid crystal layer 133A and the substrate 131A and between the liquid crystal layer 133A and the substrate 135A, respectively. The substrates 131A and 135A each are formed of, for example, a transparent substrate such as a glass substrate, and an incident light ray can pass through the substrates 131A and 135A. A voltage is supplied to the electrodes 132A and 134A from the voltage supplying section 17, and the electrodes 132A and 134A each are formed of, for example, a transparent electrode such as ITO, and an incident light ray can pass through the electrodes 132A and 134A. On a surface closer to the liquid crystal layer 133A of the electrode 134A, a plurality of concave curved surfaces is formed in a matrix form. The liquid crystal layer 133A allows an incident light ray to pass therethrough or blocks the incident light ray in response to a voltage from the voltage supplying section 17.

In such a configuration, a plurality of concave curved surfaces of the electrode 134A has different curvature radii, and, for example, the plurality of concave curved surfaces is arranged so that a curvature radius R3 of a curved surface in a central area of an array and a curvature radius R1 of a curved surface in an edge area of the array, and a curvature radius R2 of a curved surface between the central area and the edge area of the array are set so as to satisfy R3>R2>R1. In other words, the curvature radii of curved surfaces are reduced from the central area to the edge area in the array, gradually or sequentially. Thus, as each curved surface of the electrode 134A has a different curvature radius, microlenses can be set so as to focus on the interior of the living organism 2 along the shape of the living organism 2.

Moreover, in FIG. 9, the liquid crystal layer 133B is arranged between the facing substrates 131B and 135B, and the electrodes 132B and 134B are formed between the liquid crystal layer 133B and the substrate 131B, and between the liquid crystal layer 133B and the substrate 135B, respectively. As in the case of the substrates 131A and 135A, an incident light ray can pass through the substrates 131B and 135B. A voltage is supplied to the electrodes 132B and 134B from the voltage supplying section 17, and an incident light ray can pass through them. On a surface of the electrode 134B, a plurality of concave curved surfaces are formed, thereby a plurality of microlenses are formed. Moreover, on the substrate 131B, microlenses L1, L2 and L3 with different curvature radii are arranged, and, for example, a curvature radius R3 of a microlens L3 arranged in an central area of the array, a curvature radius R1 of a microlens L1 arranged in an edge area of the array and a curvature radius R2 of a microlens L2 arranged between them are set so as to satisfy R3>R2>R1. Thus, a combination of microlenses made of liquid crystal lenses and fixed focus microlenses having different curvature radii is arranged, thereby the microlenses can be set so as to focus on the interior of the living organism 2 along the shape of the living organism 2.

Except for the above-described configuration, for example, the microlens array 22 may have a configuration that an electrode is separately formed corresponding to each microlens, and a different voltage is applied to each electrode to separately drive the electrode. Moreover, the case where liquid crystal lenses are used as microlenses is described; however, the embodiment is not limited to the case. For example, as the microlens array 22, a plurality of fixed focus lenses with different curvature radii arranged on a substrate may be used.

Thus, in the case of using the microlens array 22, two-dimensional information on a plurality of layers inside the living organism 2 can be obtained collectively along the shape of the living organism 2. Therefore, even in the case where the living organism 2 has roundness (depth) in the depth direction of an optical axis, image pickup data including the depth direction can be obtained correctly. In other words, three-dimensional information can be obtained collectively along the shape of the living organism 2, so authentication can be efficiently performed.

MODIFICATION

Figure 10:
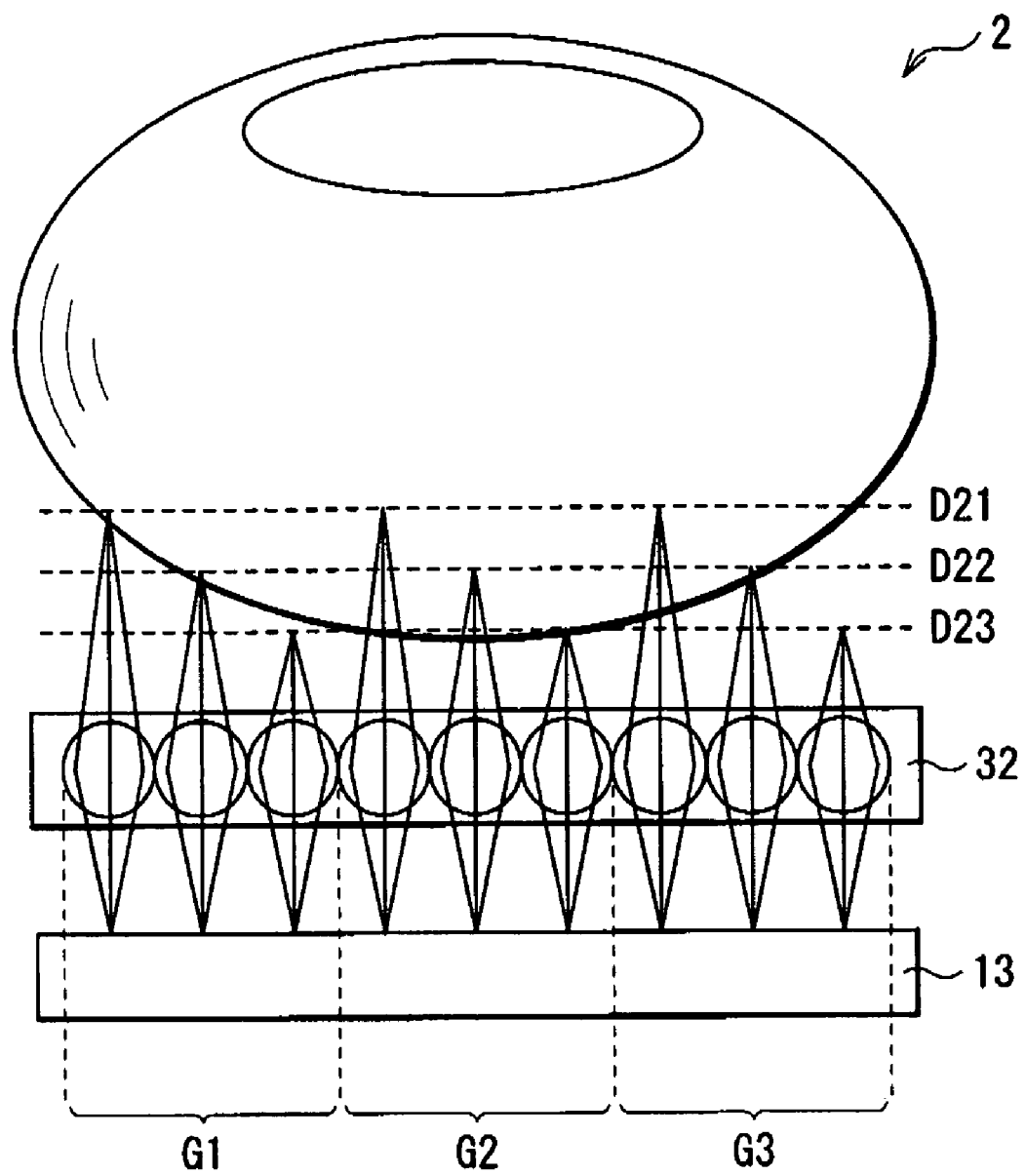
FIG. 10 is an a sectional view of essential parts of optical paths when obtaining a vein pattern of a living organism according to a modification of the invention.

Next, a modification of the microlens array 22 according to the second embodiment will be described below. FIG. 10 shows a sectional view of essential parts of optical paths when obtaining a vein pattern of the living organism 2 in the case where a microlens array 32 according to the modification is used. In the microlens array 32, a plurality of microlenses having different refractive powers is arranged periodically. For example, as shown in FIG. 10, groups G1, G2 and G3, each including three microlenses having different refractive powers, are arranged. Thereby, two-dimensional information on three different layers D21, D22 and D23 of the living organism 2 can be obtained.

Thus, microlenses having different refractive powers are periodically arranged, whereby wherever the living organism 2 is arranged relative to the microlens array 32, the shape data of veins in the depth direction inside the living organism 2 can be securely obtained. Therefore, it is not necessary to arrange the fixing cup 11 fixing the position of the living organism 2, so there is an advantage for a reduction in the profile of the whole system.

Third Embodiment

Figure 11:
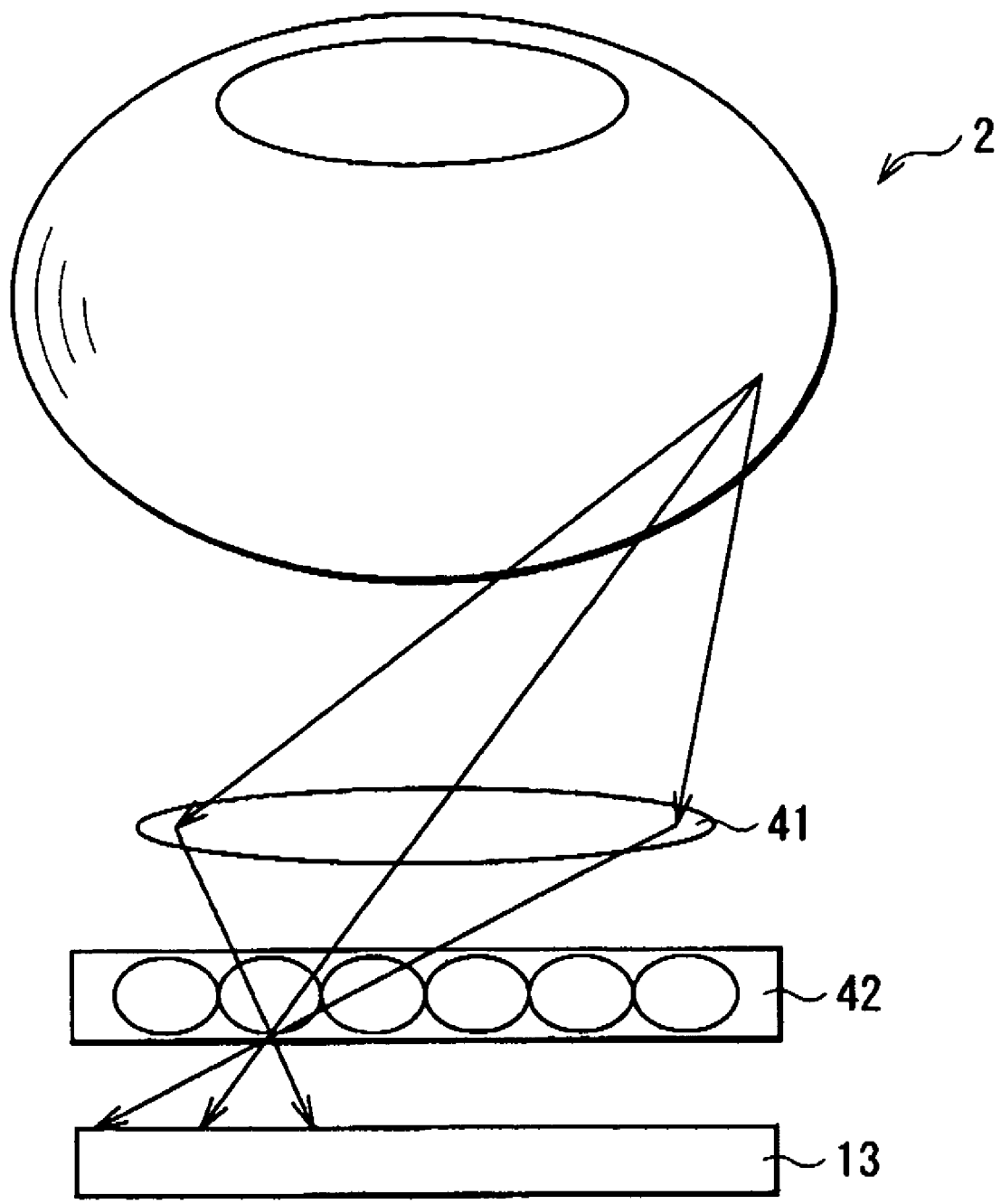
FIG. 11 is a sectional view of essential parts of optical paths in an image processing mode of processing an image of a living organism according to a third embodiment of the invention.

FIG. 11 shows a sectional view of essential parts of optical paths when obtaining a vein pattern of the living organism 2 in a biometrics authentication system according to a third embodiment of the invention. The authentication system according to the embodiment has the same configuration as that in the first embodiment, except that an image pickup lens 41 is arranged between the microlens array 12 according to the first embodiment and the living organism 2, and data obtained by picking up an image in the image processing section 14 is processed by a predetermined technique. Therefore, like components are denoted by like numerals as of the first embodiment, and will not be further described.

The image pickup lens 41 is a main lens for picking up an image of the living organism 2, and is, for example, a typical image pickup lens used in a video camera, a still camera or the like. Moreover, the microlens array 12 includes variable focusing lenses with the same configuration as in the first embodiment which are arranged in a matrix form, and in the embodiment, the microlens array 12 is arranged on a focal plane of the image pickup lens 41, and is combined with the image pickup lens 41 so as to form an image pickup lens system of the whole system.

The image processing section 14 performs predetermined image processing on image pickup data obtained by the image pickup device 13 to output the processed image pickup data as image pickup data Dout. More specifically, for example, the image processing section 14 performs refocusing arithmetic processing using a technique called "Light Field Photography", thereby an image viewed from an arbitrary viewpoint or an arbitrary direction can be reproduced.

Figure 12A:
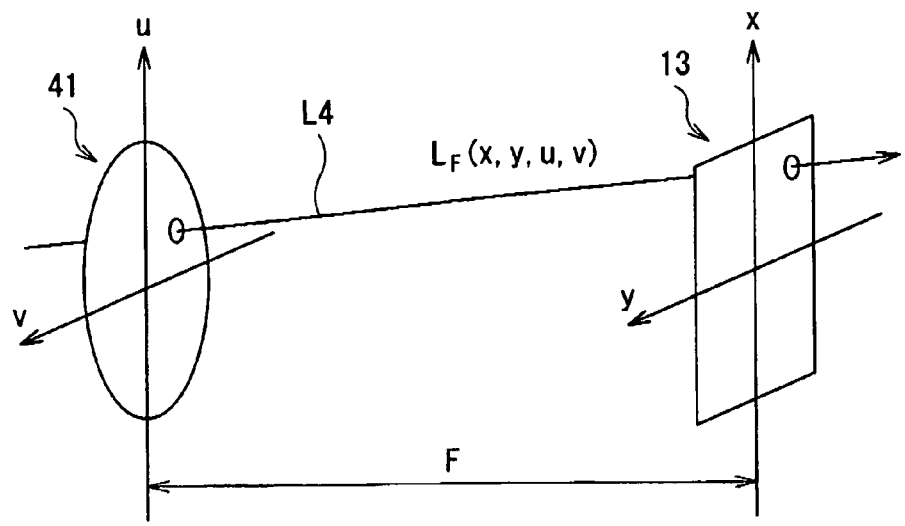
FIGS. 12A and 12B are illustrations for describing an example of image processing according to the third embodiment of the invention.
Figure 12B:
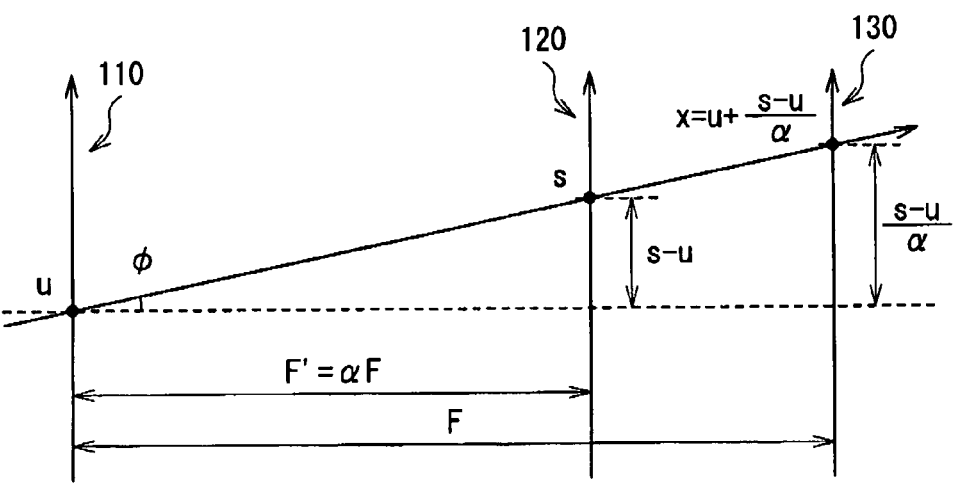

Referring to FIGS. 12A and 12B, an example of image processing (refocusing arithmetic processing) by the image processing section 14 will be described in detail below.

At first, as shown in FIG. 12A, assuming that a rectangular coordinate system (u, v) is defined on an image pickup lens plane of the image pickup lens 41, and a rectangular coordinate system (x, y) is defined on an image pickup plane of the image pickup device 13, and a distance between the image pickup lens plane of the image pickup lens 41 and the image pickup plane of the image pickup device 13 is F, a light ray passing through the image pickup lens 41 and the image pickup device 13 as shown in the drawing is represented by a four-dimensional function $L_F(x, y, u, v)$, so the light ray in a state in which, in addition to information about the position of the light ray, the traveling direction of the light ray is kept is shown.

In this case, as shown in FIG. 12B, a positional relationship between an image pickup lens plane 110, an image pickup plane 130 and a refocus plane 120 is set (the refocus plane 120 is set to be $F'=\alpha F$), detection strength $L_{F'}$ on the image pickup plane 130 of coordinates (s, t) on the refocus plane 120 is represented by Mathematical Formula 1(1). Moreover, an image $E_{F'}(S, t)$ obtained on the refocus plane 120 is a value obtained by integrating the above-described detection strength $L_{F'}$ with respect to a lens aperture, so the image $E_{F'}(s, t)$ is represented by Mathematical Formula 1(2). Therefore, when a refocusing arithmetic operation is performed from Mathematical Formula 1(2), on the basis of the image pickup data Dout after image processing, an image viewed from an arbitrary viewpoint or an arbitrary direction is reproduced.

Mathematical Formulas 1(1) and 1(2):

$$L_{F'}(s, t, u, v) = L_{(\alpha \cdot F)}(s, t, u, v) \quad (1)$$

$$= L_F\left(u + \frac{s-u}{\alpha}, v + \frac{t-v}{\alpha}, u, v\right)$$

$$= L_F\left\{u\left(1 - \frac{1}{\alpha}\right) + \frac{s}{\alpha}, v\left(1 - \frac{1}{\alpha}\right) + \frac{t}{\alpha}, u, v\right\}$$

$$E_{F'}(s, t) = \frac{1}{F'^2} \int\int L_{F'}(s, t, u, v) du dv \quad (2)$$

$$= \frac{1}{\alpha^2 F^2} \int\int L_F\left\{u\left(1 - \frac{1}{\alpha}\right) + \frac{s}{\alpha}, v\left(1 - \frac{1}{\alpha}\right) + \frac{t}{\alpha}, u, v\right\} du dv$$

In the above-described configuration, an image of the living organism 2 by the image pickup lens 41 is formed on the microlens array 12. Then, an incident light ray to the microlens array 12 reaches the image pickup device 13 via the microlens array 12, and image pickup data can be obtained from the image pickup device 13 according to the driving operation by the image pickup device driving section 16. At this time, in the microlens array 12, the refractive index of the liquid crystal layer 123 is changed according to the presence or absence of the application of a voltage between the electrodes 122 and 124 from the voltage supplying section 17, and as described above, the traveling direction of the incident light ray to the microlens array 12 is changed so as to change the focal position.

Figure 13:
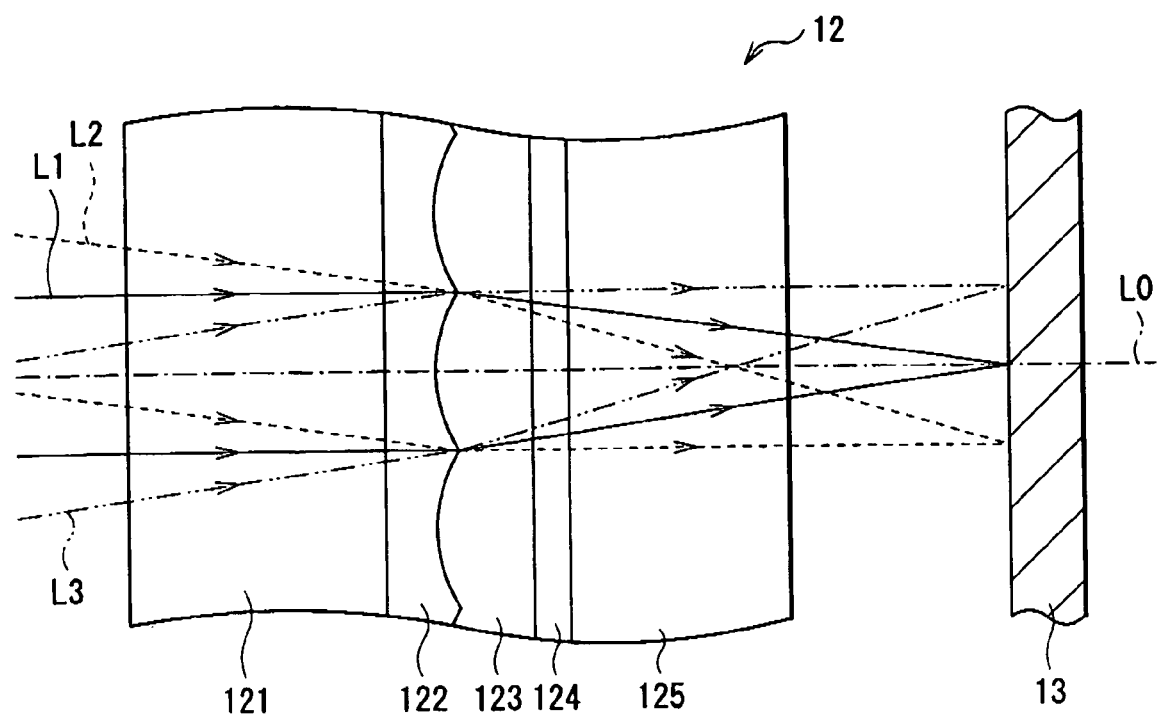
FIG. 13 is an illustration for describing an example of image processing according to the third embodiment of the invention.
Figure 14A:
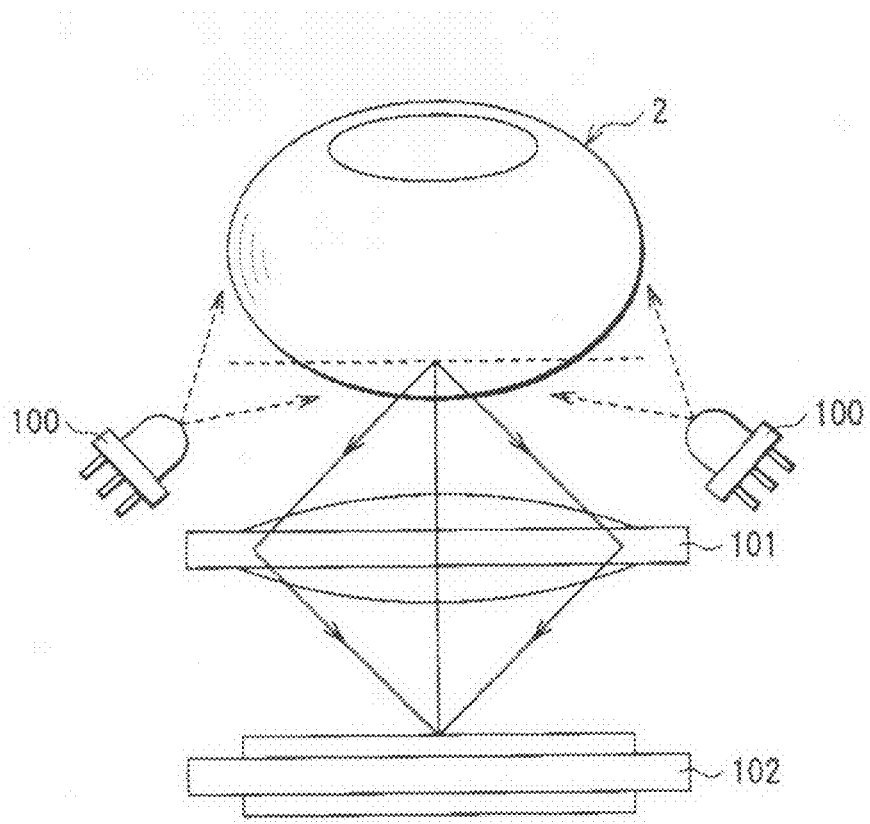
FIGS. 14A and 14B are schematic sectional views showing an outline configuration of a biometrics authentication system in a related art.
Figure 14B:
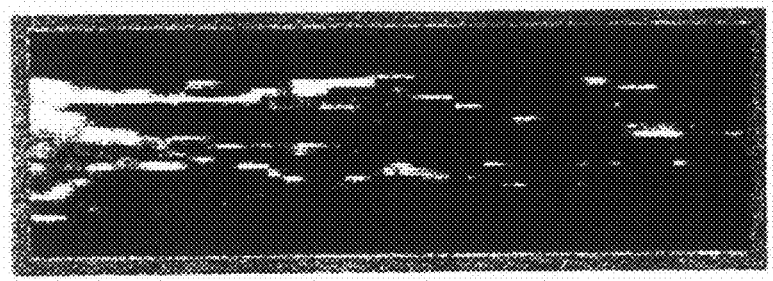

More specifically, in the case where the control section 19 controls the voltage supplying section 17 to supply a voltage, the incident light ray to the microlens array 12 is condensed on the image pickup device 13. For example, as shown in FIG. 13, incident light rays L1 to L3 to the microlens array 12 are condensed on different positions on the image pickup device 13 according to the incident directions of the incident light rays L1 to L3.

Next, the image pickup data obtained by the image pickup device 13 is inputted into the image processing section 14. Then, in the image processing section 14, in response to the control by the control section 19, predetermined image processing (for example, the above-described refocusing arithmetic processing) is performed on the image pickup data, thereby image pickup data Dout is outputted.

Thus, in the embodiment, when a voltage is applied from the voltage supplying section 17 to microlenses in the microlens array 12, an incident light ray to the microlenses is refracted to be condensed on the image pickup device 13. Thereby, three-dimensional shape information including the depth information inside the living organism 2 can be obtained. Moreover, distance information such as information about a distance between veins or angle information can be obtained, and an image can be reproduced from a more flexible viewpoint or direction can be reproduced. When the three-dimensional shape information, distance information and angle information are used as authentication elements, authentication precision can be further improved. In addition, the degree of freedom of the position of the living organism 2 during authentication is increased whereby the authentication operation can be simplified.

Although the present invention is described referring to the first, second and third embodiments and the modification, the invention is not limited to them, and can be variously modified.

For example, in the above-described embodiments or the like, the case where the surface S1 of the surfaces S1 and S2 of the electrodes 122 and 124 has a curved surface in the microlens arrays 12, 22, 32 and 42 is described; however, for example, the surface S2 may also have a curved surface, thereby microlenses having curved surfaces on both sides of the liquid crystal layer 123 may be formed.

Moreover, in the above-described embodiments or the like, in the case where the microlenses are formed of liquid crystal microlenses is described; however, microlenses with any other configuration may be used. For example, liquid microlenses using two liquid layers of different kinds may be used.

Further, the light source 10 applies light from the image pickup device 13; however, not only in a system (a transmission system) in which the light source 10 is arranged on a side facing the image pickup device 13 with the living organism 2 in between, or the case where the light source 10 is arranged on the longitudinal side of a living organism, but also in the case where the light source 10 is arranged on the lateral side of a finger, a system of obtaining three-dimensional shape data according to the invention is effective.

Moreover, the case where when a voltage supplied from the voltage supplying section 17 to the microlenses in the microlens array 12 is relatively large, the focal length is relatively short, and when the supplied voltage is relatively small, the focal length is relatively large is described; however, depending on the kind of a liquid crystal material forming the liquid crystal layer 123 of the microlens array 12, the biometric authentication system can have a configuration in which when the voltage is relatively large, the focal length can be relatively large, and when the voltage is relatively small, the focal length can be relatively short. Even in this case, the same effects as those in the above-described embodiments can be obtained.

Further, in the third embodiment, as an example of an image processing method in the image processing section 14, refocusing arithmetic processing using "Light Field Photography" is described; however, the image processing method in the image processing section 14 is not limited to this, and any other image processing method may be used.

It should be understood by those skilled in the art that various modifications, combinations, sub-combinations and alterations may occur depending on design requirements and other factors insofar as they are within the scope of the appended claims or the equivalents thereof.

What is claimed is:

1. A biometrics authentication system comprising:
   a light source applying light to a living organism;
   a microlens array section condensing light from the living organism, and including a plurality of microlenses each having a different refractive power;
   an image pickup device obtaining image pickup data on a plurality of layers of the living organism on the basis of the light condensed by the microlens array section; and
   an authentication section performing authentication of the living organism on the basis of the image pickup data on the plurality of layers of the living organism; and
   a voltage supplying section supplying a voltage to the microlens array section,
   wherein the microlenses change their refractive powers according to a voltage supplied from the voltage supplying section, and wherein the microlens array section includes:
   a pair of substrates;
   a pair of electrodes to which a voltage from the voltage supplying section is applied, the pair of electrodes being formed on the substrates; and
   a liquid crystal layer being arranged between the pair of electrodes, wherein
   at least one of the pair of electrodes has a curved surface for forming the microlenses.

2. The biometrics authentication system according to claim 1, wherein
   the refractive powers of the plurality of microlenses are set so that the focal positions of the plurality of microlenses are arranged along the shape of the living organism.

3. The biometrics authentication system according to claim 1, further comprising:
   an image pickup lens being arranged on an optical path between the living organism and the microlens array section; and
   an image processing section for performing predetermined image processing on the image pickup data of the living organism obtained by the image pickup device,
   wherein the authentication section performs the authentication of the living organism through the use of image pickup data on which the image processing is performed by the image processing section.

4. The biometrics authentication system according to claim 1, wherein the light source emits light of a near-infrared wavelength region.

5. A biometrics authentication system comprising:
a light source applying light to a living organism;
a microlens array section condensing light from the living organism, and including a plurality of microlenses each having a different refractive power;
an image pickup device obtaining image pickup data on a plurality of layers of the living organism on the basis of the light condensed by the microlens array section; and
an authentication section performing authentication of the living organism on the basis of the image pickup data on the plurality of layers of the living organism, wherein
the plurality of microlenses each having a different refractive power are arranged periodically.

6. The biometrics authentication system according to claim 5, further comprising:
an image pickup lens being arranged on an optical path between the living organism and the microlens array section; and
an image processing section for performing predetermined image processing on the image pickup data of the living organism obtained by the image pickup device,
wherein the authentication section performs the authentication of the living organism through the use of image pickup data on which the image processing is performed by the image processing section.

7. The biometrics authentication system according to claim 5, wherein
the refractive powers of the plurality of microlenses are set so that the focal positions of the plurality of microlenses are arranged along the shape of the living organism.

8. The biometrics authentication system according to claim 5, wherein
the light source emits light of a near-infrared wavelength region.

9. The biometrics authentication system according to claim 5, further comprising:
a voltage supplying section supplying a voltage to the microlens array section,
wherein the microlenses change their refractive powers according to a voltage supplied from the voltage supplying section.

* * * * *